United States Patent [19]

Ridgway

[11] Patent Number: 4,583,714

[45] Date of Patent: * Apr. 22, 1986

[54] VEHICLE MOUNTABLE CABLE REEL APPARATUS

[75] Inventor: Lance D. Ridgway, Carlsbad, N. Mex.

[73] Assignee: Hy-Reel Machinery, Inc., Carlsbad, N. Mex.

[*] Notice: The portion of the term of this patent subsequent to Feb. 1, 2000 has been disclaimed.

[21] Appl. No.: 462,647

[22] Filed: Jan. 31, 1983

Related U.S. Application Data

[63] Continuation of Ser. No. 134,236, Mar. 26, 1980, Pat. No. 4,371,147.

[51] Int. Cl.$^4$ ............................................. B66D 1/38
[52] U.S. Cl. .................................................... 254/326
[58] Field of Search ............... 254/325, 326, 327, 279, 254/280, 281, 361, 332, 329, 365, 346, 395, 396, 397, 398, 400, 402, 404, 405, 416, 134.3 R; 242/86.5 R, 86.52, 86.51; 414/563, 569

[56] References Cited

U.S. PATENT DOCUMENTS

| | | | |
|---|---|---|---|
| 555,849 | 3/1896 | Crowder . | |
| 1,485,425 | 3/1924 | Myette . | |
| 1,535,221 | 4/1925 | Hansen . | |
| 1,864,676 | 6/1932 | Smith et al. . | |
| 2,008,612 | 7/1935 | Heath . | |
| 2,090,445 | 8/1937 | Fultz et al. . | |
| 2,243,642 | 5/1941 | Muir et al. . | |
| 2,258,889 | 10/1941 | Graham . | |
| 2,290,037 | 7/1942 | Dennison . | |
| 2,414,573 | 1/1947 | Wagner et al. . | |
| 2,423,906 | 7/1947 | Schultz . | |
| 2,458,573 | 1/1949 | Donahue . | |
| 2,556,937 | 6/1951 | O'Keefe . | |
| 2,566,512 | 9/1951 | Bilderbeck . | |
| 2,603,432 | 7/1952 | Paulsen . | |
| 2,657,879 | 11/1953 | Pike . | |
| 2,848,123 | 8/1958 | Keys . | |
| 2,876,916 | 3/1959 | Austrow et al. . | |
| 2,939,647 | 6/1960 | Goode . | |
| 2,949,279 | 8/1960 | Eitel | 254/397 |
| 2,959,396 | 11/1960 | Lawrence | 254/332 |
| 3,030,075 | 4/1962 | Kocalis | 254/134.3 R |
| 3,070,355 | 12/1962 | Wyatt . | |
| 3,073,539 | 1/1963 | Brown . | |
| 3,098,639 | 7/1963 | Bromberg . | |
| 3,103,345 | 9/1963 | Eitel . | |
| 3,130,453 | 4/1964 | Haigler, Jr. . | |

(List continued on next page.)

FOREIGN PATENT DOCUMENTS

| | | | |
|---|---|---|---|
| 200294 | 4/1958 | Austria | 254/332 |
| 2352700 | 10/1973 | Fed. Rep. of Germany . | |
| 818894 | 6/1937 | France . | |
| 1095155 | 12/1954 | France . | |
| 101930 | 3/1963 | Norway . | |

*Primary Examiner*—Billy S. Taylor
*Attorney, Agent, or Firm*—James C. Wray

[57] ABSTRACT

A truck mounted hydraulic cable reel apparatus for heavy power cable includes bed frame members supporting a circular turntable. A motor rotates the turntable 45° to either side of a longitudinal center line. Two vertical stanchions are mounted on the turntable. One stanchion supports a tail stock assembly, and a second supports a reel drive assembly. The drive assembly includes a reel drive shaft connected at one end to a hydraulic motor and having a reel drive face plate on the other end. The face plate has lugs which engage lugs on an end of the cable reel spool shaft. The hydraulic motor reversely rotates the cable spool to wind in or pay out power cable. Vertical guide rollers are disposed at either end of the horizontal cable roller. Telescoping outrigger booms are adjustably positioned on either side of the bed frame. Multiple guide rollers on the ends of the booms open and lock closed to capture the power cable and to act as outriggers when laying or retrieving cable. A truck drives along a road with the turntable turned 45°, cable extends from the reel, over the horizontal roller along a vertical roller and out through the outrigger guide rollers into a ditch or along a roadside.

18 Claims, 14 Drawing Figures

U.S. PATENT DOCUMENTS

| | | |
|---|---|---|
| 3,226,087 | 12/1965 | Eitel .................... 254/134.3 P |
| 3,300,191 | 1/1967 | Leigh ........................ 254/39 |
| 3,317,149 | 5/1967 | Gooch ..................... 254/134.3 R |
| 3,319,905 | 5/1967 | Kissilor . |
| 3,380,545 | 4/1968 | Kemper . |
| 3,458,152 | 7/1969 | Barkley et al. . |
| 3,499,610 | 3/1970 | Leonard . |
| 3,524,606 | 8/1970 | Coski . |
| 3,531,087 | 9/1970 | Wilson . |
| 3,544,031 | 12/1970 | White . |
| 3,578,787 | 5/1971 | Brickett . |
| 3,588,051 | 6/1971 | Leeming . |
| 3,622,094 | 11/1971 | Gaskin . |
| 3,652,026 | 3/1972 | Ewebro . |
| 3,718,108 | 2/1973 | Janssen . |
| 3,744,759 | 7/1973 | Jennings . |
| 3,809,334 | 5/1974 | Beurer et al. . |
| 3,829,064 | 8/1974 | Jackson .................... 254/332 |
| 4,046,331 | 9/1977 | Decker, Sr. . |
| 4,200,245 | 4/1980 | Bugnone .................... 242/68.4 |

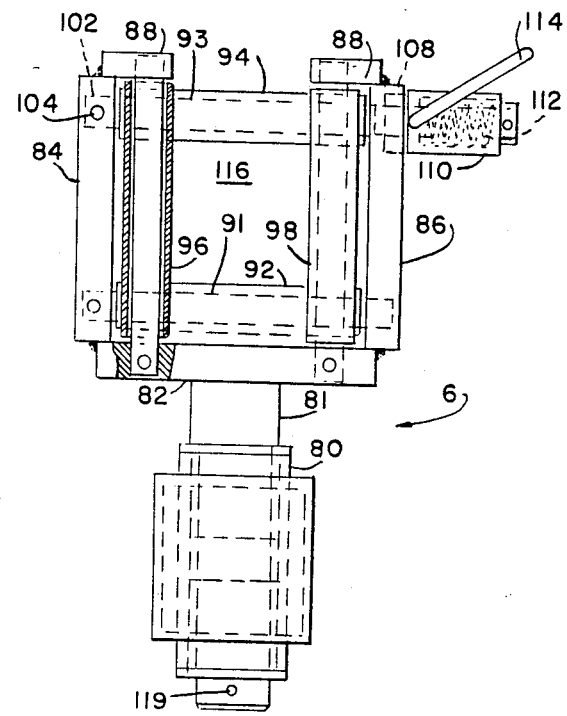
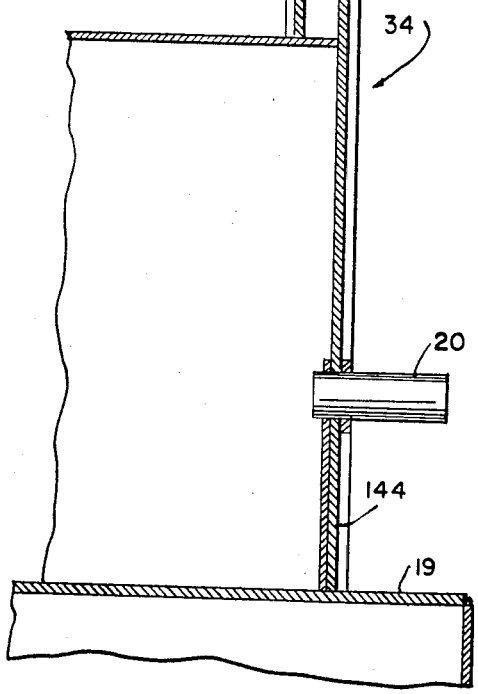
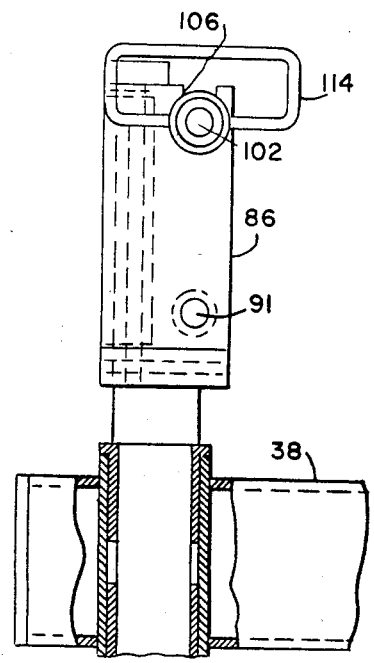

ns are to be or by 20 at an angle to the vehicle, there were problems in direct-
VEHICLE MOUNTABLE CABLE REEL APPARATUS This application is a continuation of application Ser. No. 134,236, filed Mar. 26, 1980, and now U.S. Pat. No. 4,371,147.

BACKGROUND OF THE INVENTION

The present invention relates to a vehicle mountable hydraulic cable reel apparatus for extremely heavy power cable. The cable reel mechanism is rotatable on a turntable. The reel may be driven in one of two directions to pay out or pull in the cable attached to the reel, and the cable reel spool is removable.

In the past, in laying or retrieving cable with a vehicle mountable cable reel apparatus, when the cable was behind the vehicle, satisfactory results were realized. However, if the vehicle was limited to the road or by the conditions of the terrain, or the cable would be off at an angle to the vehicle, there were problems in directing the cable when it was laid and in stressing the cable when it was retrieved. It was necessary to employ men during the cable laying or retrieving operations to assist in guiding when the cable was offset to the left or the right of the cable reel apparatus. The employment of men added expense and labor problems and kept operations slow and irregular.

SUMMARY OF THE INVENTION

A hydraulic cable reel apparatus comprising a bed frame member supporting a deck plate with a large circular hole into which is disposed a turntable. The turntable is of a diameter slightly less than that of the circular hole in the deck plate. Disposed beneath the turntable is a turntable motor which rotates the turntable clockwise or counterclockwise. Mounted on the deck plate closer to one end is a control console for operating the cable reel mechanism, and adjacent to the console is a hydraulic fluid reservoir. A telescoping outrigger is disposed on the outer side of each of the side bed frame members. Each outrigger is rotatably fixed at one end and can be rotated away from the side of the bed frame member through an obtuse angle. In the end of each of the telescoping outriggers is a multiple roller guide means into which the cable is passed. The end opposite the one rotatably fixed can be detachably fixed. Mounted on top of the turntable is the cable reel mechanism. Two vertical stanchions are attached to the turntable and a tail stock assembly and a cable reel drive housing are attached to the two vertical stanchions respectively. The tail stock assembly supports and engages the shaft of the cable reel spool. The tail stock assembly has a screw means by which the cable reel spool shaft and spool may be displaced away from the tail stock along the longitudinal axis of the cable reel shaft. The cable reel drive housing assembly consists of an upper and lower housing, each carrying a replaceable bushing to hold a shaft. The cable reel drive housing encases the reel drive shaft, and the reel drive shaft is connected on one end to a hydraulic motor and on the other to the reel drive face plate. The reel drive face plate has spaced lugs radially outward from the axis of the reel drive face plate. The cable reel spool consists of a spool with a shaft extending from either end of the spool. One end of the spool has a plurality of single ears perpendicular to the end of the spool and radially outward from the longitudinal axis of the spool. The ears on the end of the spool are disposed in the space between the lugs of the reel drive face plate. The screw means of the tail stock which displaces the spool and spool shaft along the longitudinal axis of the spool is used to displace the spool so as to engage the ears of the end of the spool with the lugs of the reel drive face plate when the spool is being installed. Conversely, when the spool is to be removed, the screw means is used to allow displacement of the spool and spool shaft away from the reel drive face plate, allowing for the disengagement of the ears of the end of the spool and the ears of the reel drive face plate. The horizontal roller is disposed in a position aft of the cable reel mechanism. The horizontal roller has a vertical guide disposed on either end of the horizontal roller. The horizontal roller is attached to the exterior face of the vertical stanchions by truss means. These truss means attach to the end of the horizontal roller in a configuration so as to also support the vertical rollers.

In operation, the hydrauic cable reel apparatus is used to retrieve or lay electrical cable. The operator of the cable reel apparatus will be stationed at the control console, from which he may operate either the hydraulic motor for operation of the reel or the turntable motor for operation of the turntable. In an operation requiring the use of the cable reel apparatus, the turntable with the cable reel mechanism thereon disposed will be rotated clockwise or counterclockwise in order to align the cable reel mechanism with the direction of the work. Whichever side the cable reel mechanism is directed, the outrigger on that side will be disposed. The outrigger is disposed by rotation about the fixed end to the desired angle at which the outrigger may be adjustably fixed. The outrigger is then telescoped out to a desired length and fixed. The multiple roller guide on the end of the telescopable outrigger opposite the rotatably fixed end is rotatably fixed to the outrigger. The horizontal roller at the top of the multiple roller guide is spring biased and detachably fixed at one side. This horizontal roller can be detached and rotated open so as to dispose the electrical cable in the guide, and once the cable is so disposed, the rotated roller may be replaced so as to contain the electrical cable therein for guiding operations.

Having so configured the cable reel apparatus, the operator at the control console may operate the hydraulic motor, which, in turn, through the reel drive shaft and reel drive face plate, will rotate the cable reel spool either clockwise or counterclockwise to effect a pay out or pull in of the electrical cable. Dependent on the operation being performed, if the spool is ready for replacement then the screw means of the tail stock will be utilized to disengage the spool so replacement may be effected.

It is the object of this invention to provide a vehicle mountable cable reel apparatus where the cable reel mechanism is rotatable to either side by turntable.

It is another object of the invention to provide a cable reel apparatus where the cable reel spool is readily removable.

It is another object of the invention to provide a cable reel apparatus which has outriggers with vertical multiple roller guides which provide extendable guides for the cable reel apparatus.

Another object of the invention is to provide a cable reel apparatus with a drive means for the cable reel spool, with a spool-driving hydraulic motor connected to the reel drive shaft further connected to a reel drive face plate, wherein the reel drive face plate engages the spool to effect turning of the spool in a clockwise or a counterclockwise direction.

It is another object of the invention to provide a cable reel apparatus wherein the hydraulic system is a balanced hydraulic system.

In accordance with these objects, but not limited to these objects, this invention will be described in specificity hereinafter with particular reference to the accompanying drawings.

BRIEF DESCRIPTION OF THE DRAWINGS

FIG. 8 shows the multiple roller guide means disposed on the end of the outrigger.

FIG. 9 shows a side view of the multiple roller guide means as embodied in FIG. 13.

FIG. 14 shows a sectional view of the top half of the cable reel spool.

DETAILED DESCRIPTION OF THE DRAWINGS

Figure 1:
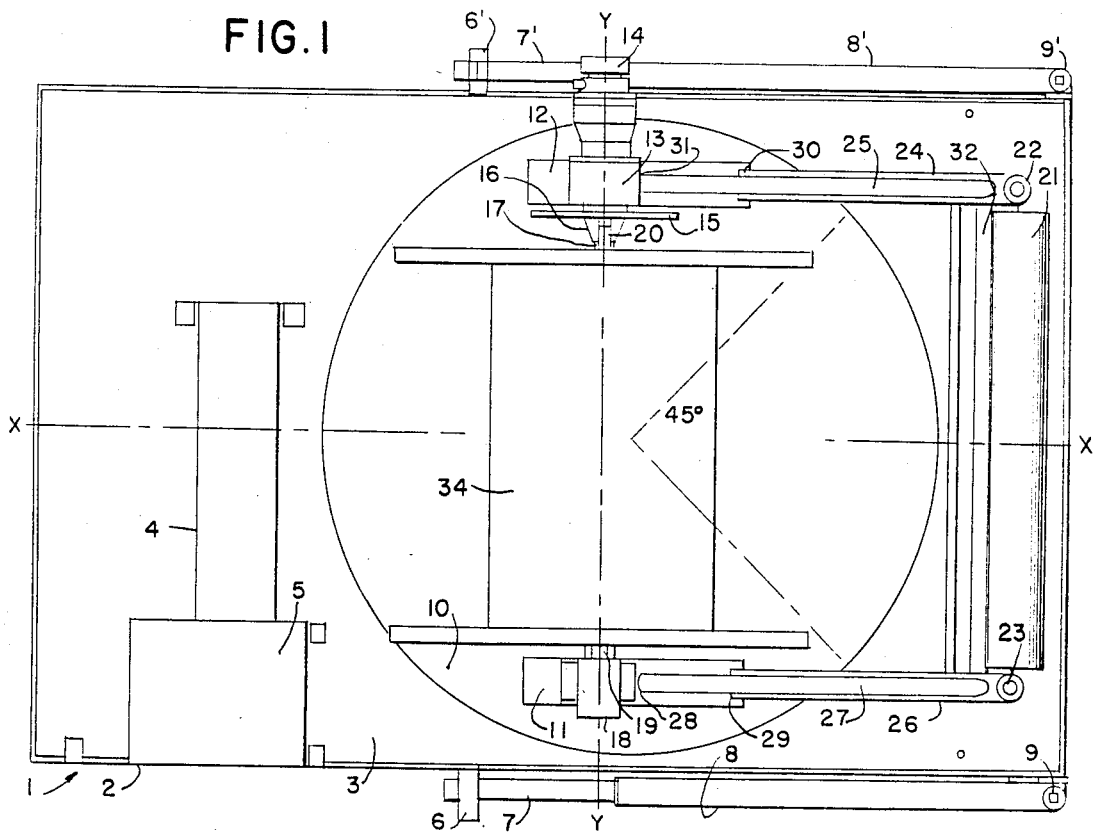
FIG. 1 shows a top view of the instant invention.

Referring to FIG. 1, the vehicle mountable hydraulic cable reel apparatus, as indicated at 1, includes a cable reel bed where the external surfaces of the bed, generally shown at 2, have a deck plate 3 attached on the upper surface. The hydraulic reservoir 4 and a control console 5 are disposed on the upper surface of the deck plate. The hydraulic reservoir 4 and control console 5 are deployed adjacent to one another and nearer to the end of a deck plate 3, which is closest to the cab portion of the vehicle which would be carrying the hydraulic cable reel apparatus. Control console 5 is of conventional construction, utilizing conventional controls for operation of the cable reel apparatus.

The outriggers, shown at 8 and 8', have telescoping sections 7 and 7' and vertical roller guide means at 6 and 6'. The outriggers 8 and 8' are rotatably fixed to the sides of a bed frame 2 at 9 and 9' respectively.

Deck plate 3 has a large circular hole into which a turntable 10 is disposed. The turntable 10 is rotatable about its geometric center and rides on rollers shown in FIG. 3. Turntable 10 is of a diameter slightly less than the large circular hole in the deck plate 3. The deck plate 3, bed frame 2 and turntable 10 are situated so that the turntable 10 is flush with the horizontal surface of deck plate 3 when the turntable 10 is disposed in the circular hole of deck plate 3. Although not shown in FIG. 1, a turntable motor is disposed beneath the geometric center of turntable 10. The motor rotates the turntable through an arc of 45° clockwise or counterclockwise to the longitudinal center line of deck plate 3, shown at line x—x. This rotation of the turntable 10 will allow the reel mechanism disposed thereupon to be directed a maximum of 45° either clockwise or counterclockwise of line x—x.

Vertical stanchions 11 and 12 are disposed on the upper surface of turntable 10. The vertical stanchions provide the basis of support for the later described cable reel spool through other intermediate members. The upper surface of stanchion 11 supports an intermediate member, the tail stock assembly 18. The tail stock assembly engages and supports the spool shaft 19 and additionally provides other functions to be hereinafter described.

A second vertical stanchion 12 supports a cable reel bearing assembly 13. The cable reel bearing assembly encases a reel drive shaft, not shown in FIG. 1. This reel drive shaft is connected on one end to hydraulic motor 14 and on the other end to reel drive face plate 15. The hydraulic motor 14 is capable of rotation either clockwise or counterclockwise. This rotation created by hydraulic motor 14 is transmitted through the reel drive shaft, not shown, through the reel drive face plate 15 and ultimately to cable reel spool 34. The drive reel face plate 15 has two pairs of spaced ears 16 disposed perpendicular to the reel drive face plate 15 and radially outward from the center of reel drive face plate 15. The reel drive face plate and reel drive shaft engage the spool shaft 19 The end of spool shaft 19 closest to reel drive face plate 15 has single ears 20 that are radially outward from the longitudinal axis of the spool shaft 19. The ears 20 are disposed in the space between the ears 16 of reel drive face plate 15. The hydraulic motor 14, which turns in a clockwise or counterclockwise direction, turns the reel drive shaft which, in turn, rotates the reel drive face plate 15. Paired ears 16 of reel drive face plate 15 engage ear 20 of cable reel spool 34. Spool shaft 19 engages drive reel face plate 15 and reel drive shaft, not shown. With the spool shaft 19 so disposed and the ears of reel drive face plate 15 engaging ear 20 of spool 34, turning of spool 34 is effected either clockwise or counterclockwise, depending on the rotation of hydraulic motor 14.

Horizontal cable roller 21 is disposed in a position so as to allow cables from spool 34 to pass over the horizontal roller 21 when the cable is either paid out or pulled in. At either end of horizontal roller 21 are disposed vertical guide rollers 22 and 23. The horizontal roller 21 with vertical guide rollers 22 and 23 is supported by a truss means extending from the horizontal roller 21 to the face of vertical stanchions 11 and 12. The truss means consists of upper truss member 27 and lower truss member 26 on one side and upper truss member 25 and lower truss member 24 on other opposite side. Truss members 24 and 25 connect one end of horizontal roller 21 to vertical stanchion 12, while truss members 26 and 27 connect one end of horizontal roller 21 to vertical stanchion 11. The truss members 24 and 25 have connection points with vertical stanchion 12 at 30 and 31 respectively. Truss members 26 and 27 have connection points with vertical stanchion 11 at 29 and 28 respectively. Horizontal truss member 32 serves as a strength member between the two sets of truss members connecting the horizontal roller 21 with vertical stanchions 11 and 12.

Figure 2:
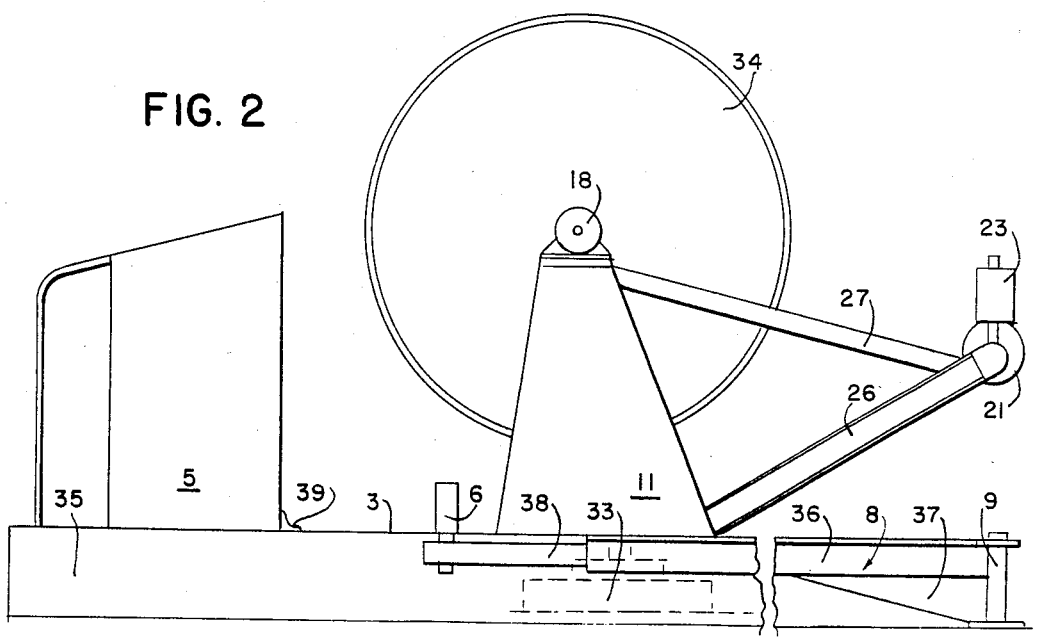
FIG. 2 shows a side view of the instant invention of the embodiment shown in FIG. 1.

Referring to FIG. 2, the view shown is a side view of FIG. 1. The side of the cable reel bed is depicted by side frame member 35. The outrigger 8 is rotatably fixed to the side of bed frame member 35 at 9. As can be seen, a reinforcement section 37 for adding support to the outrigger 8 is disposed beneath the tubular section of outrigger 8 so as to provide support for the outrigger 8 when it is loaded. The support section 37 is of a right triangular shape which extends along the lower section of the tubular member of outrigger 8. The telescoping section 38 of outrigger 8 fits into the first tubular section 36 of outrigger 8. The multiple guide roller means 6 is disposed at the end of the telescoping section 38.

Bed frame member 35 is one of the members of a cable reel bed and, as such, provides support for a deck plate 3. Control console 5 is mounted on the deck plate 3 and is attached to deck plate 3 by use of angle iron members at 39.

Vertical stanchion 11 is connected to the turntable 10 in FIG. 1. The vertical stanchion 11 provides support for the tail stock assembly 18 and the horizontal roller 21. The horizontal roller 21 and vertical guide roller 23 are supported by stanchion 11 by means of truss members 26 and 27.

Figure 3:
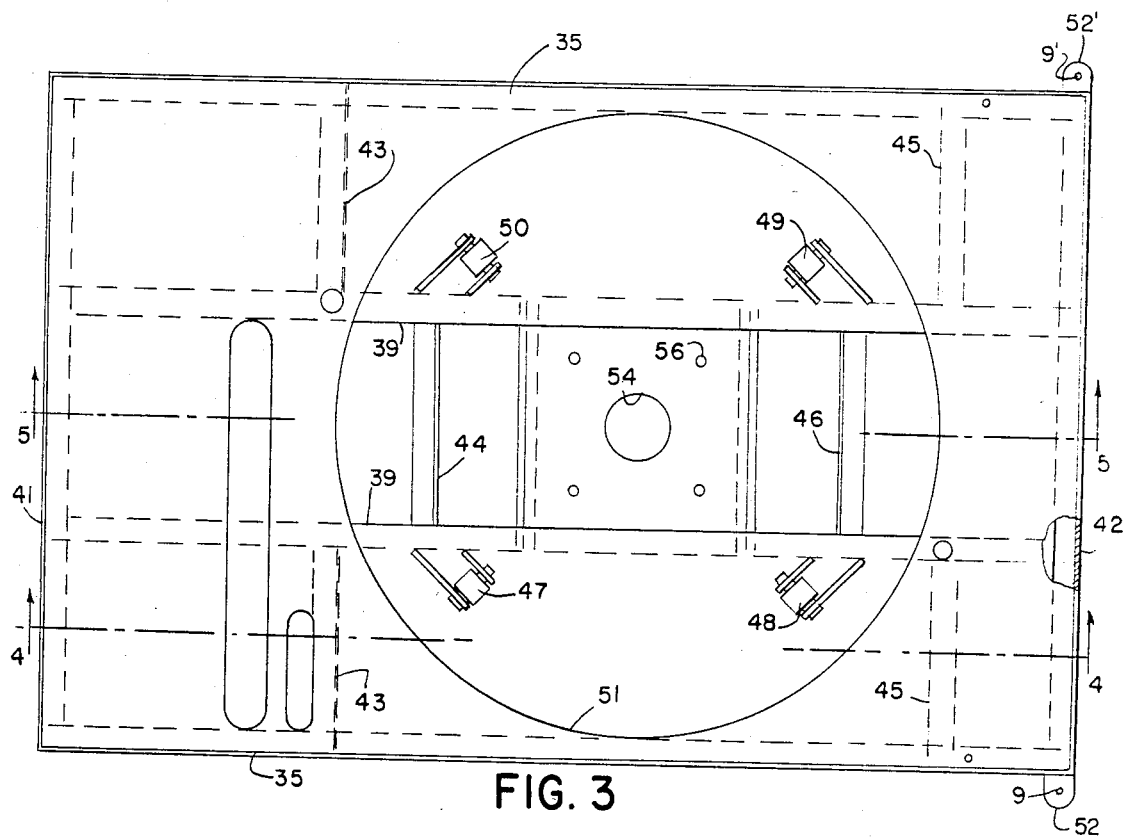
FIG. 3 shows a top view of the cable reel bed with the deck plate and with the turntable removed.

FIG. 3 shows the cable reel bed assembly with the deck plate removed. As can be seen, the cable reel bed has external and internal longitudinal frame members 35 and 39. The bed frame has two full length transverse bed frame members, 41 and 42. There are a number of transverse bed frame members, 43, 44 45 and 46 which connect two adjacent longitudinal bed frame members. Rollers 47, 48, 49 and 50 are attached to interior bed frame members 39. The rollers are used to support and allow rotation of the turntable. The turntable fits in the area circumscribed by the circle 51.

The outriggers are rotatably fixed to the side of bed frame members 35 at 9 and 9'. The lugs 52 and 52' are mounted on bed frame members 35 that have holes which are adapted to receive pins. The pins are used to detachably fix an outrigger at angles to the bed 2 as the outrigger is rotated about point 9 or 9' away from side frame 35. Hole 54 provides an opening for receiving a turntable drive shaft.

Figure 4:
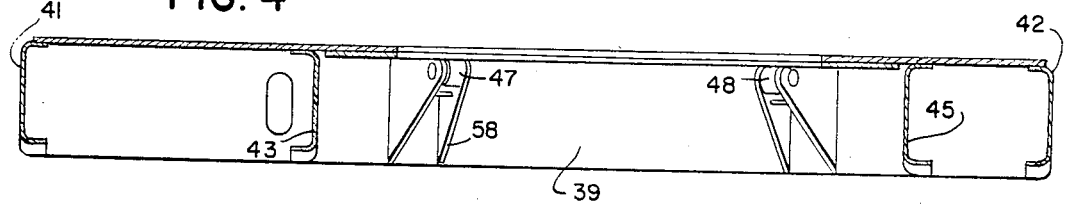
FIG. 4 shows a cross-sectional view of the cable reel bed of FIG. 3 taken along a line 4—4.

In FIG. 4, the longitudinal bed frame shown at 39 is an interior bed frame. Attached to the bed frame are brackets 58, which carry rollers 47 and 48. When the turntable 10 is set into recess 60, the turntable rides on rollers 47 and 48. The brackets 58, are set at such an angle to allow rotation of the turntable when it is set into recess 60. The transverse bed frame members 41 and 42 are full length members. Transverse bed frame members extend between two longitutinal bed frame members 35 and 39.

Figure 5:
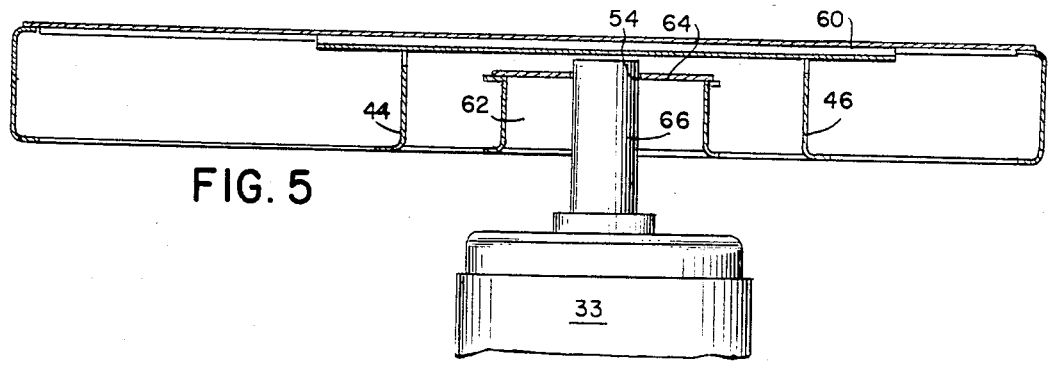
FIG. 5 shows a sectional view of the cable reel bed of FIG. 3 taken along line 5—5.

In FIG. 5 a sectional view of FIG. 3 is shown. The turntable motor 33 is disposed in cavity 62. The upper part of the cavity has a plate 64 to which the turntable motor 33 is attached. The shaft 66 of the turntable motor 33 extends through opening 54 and attaches to the turntable that is disposed in recess 60. Bed frame members 44 and 46 extend between longitudinal bed frame members 39.

Figure 6:
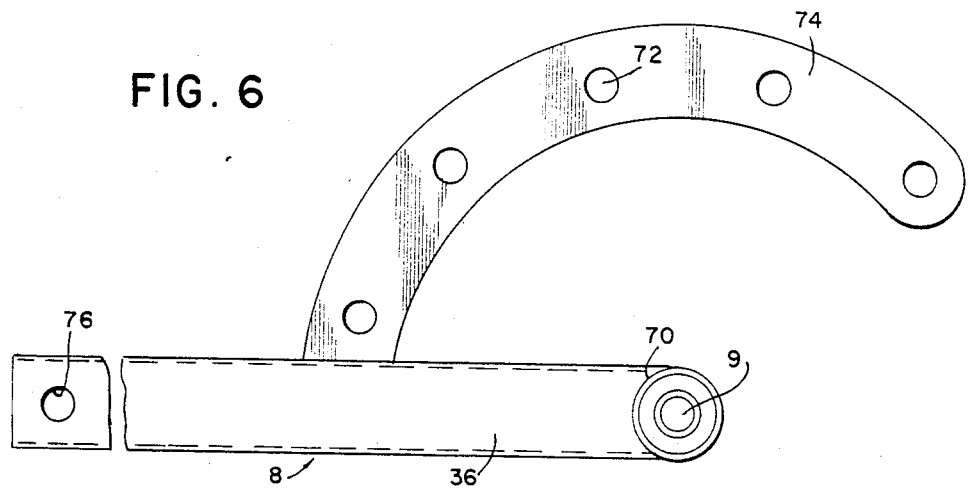
FIG. 6 shows a top view of the fixably rotatable end of the outrigger with the guide arm.
Figure 7:
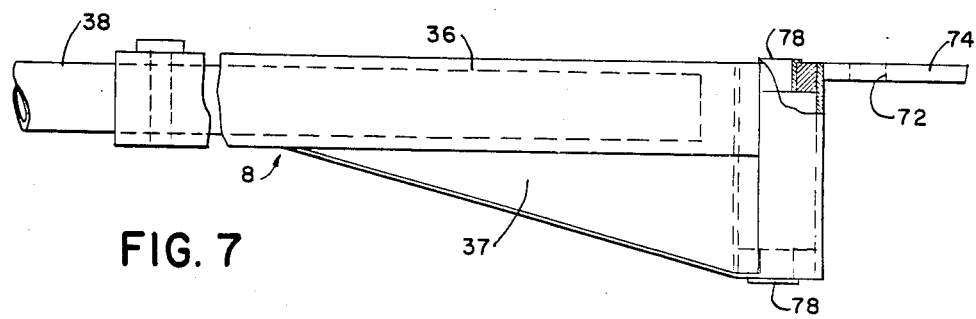
FIG. 7 is a side view of the end of the outrigger as embodied in FIG. 6.

Referring to FIGS. 6 and 7, outrigger 8 has an end 70 which is rotatably fixed to the bedside frame member. When outrigger 8 is rotated about pivot 9, the outrigger can be fixed at certain angles by aligning one of the holes 72 in arm 74 with the hole in the longitudinal bed frame member 35 and inserting a pin. Although it is shown that holes 72 are placed at specific angles, for example, at intervals of 30°, the holes may be spaced at any desired angles.

Hole 76 is adapted for use for the telescoping portion 38 of outrigger 8, which is not shown. The telescoping member 38 can be slid out of the base tubular member 36 of outrigger 8 to the desired length. A pin is passed through hole 76, which corresponds with a hole in the telescoping portion of outrigger 8, which will hold the telescoping portion 38 in place.

Support member 37 is used as indicated to add strength to outrigger 8.

FIGS. 8 and 9 shows the multiple roller guide means 6, which is disposed on an outer end of the extendable section 38 of outrigger 8. The fitting 80 attaches the multiple roller guide means 6 to the extendable section 38 of the outrigger 8 and allows for rotation of the multiple roller guide means 6 within fitting 80.

The portion of the multiple roller guide means 6 that receives the cable, has a rigid U-shaped frame with members 82, 84 and 86. Vertical sections have openings to receive the shafts 91 and 93. Lugs 88 welded on top of sections 84 and 86 cooperate with base 82 to receive ends of shafts of vertical rollers 96 and 98.

Horizontal roller 94 is uniquely mounted in comparison to the other rollers. One end of shaft 102 is pivoted on pin 104 in frame member 84. The opposite end of shaft 102 is detachably fixed to frame member 86. That end of the roller shaft 102 fits into recess 106. At recess 106, a bore 108 is countersunk to allow seating of the biased member 110. Member 110 is spring biased into the bore by spring 112. When there is desired release of roller 94, handle 114 is pulled to compress the spring and retract member 110 from bore 108 and to thus allow rotation of the roller 94 upward about pin 104 opening space 116 to allow the ingress or egress of a cable. When the cable is placed in or removed from space 116 the roller 94 is rotated back to close the top of the U-shaped area. The handle 114 is used to compress spring 112 thus pulling back member 110 to allow the shaft 102 of roller 94 to fit into recess 106. When the shaft 102 is in the recess, the handle 114 is released to allow spring 112 to seat member 110 into the bore 108.

Fitting 80, which attaches the multiple roller guide means 6 to the telescoping arm 38, allows for rotation of shaft 81. Pin 119 keeps the shaft 81 within fitting 80.

Figure 10:
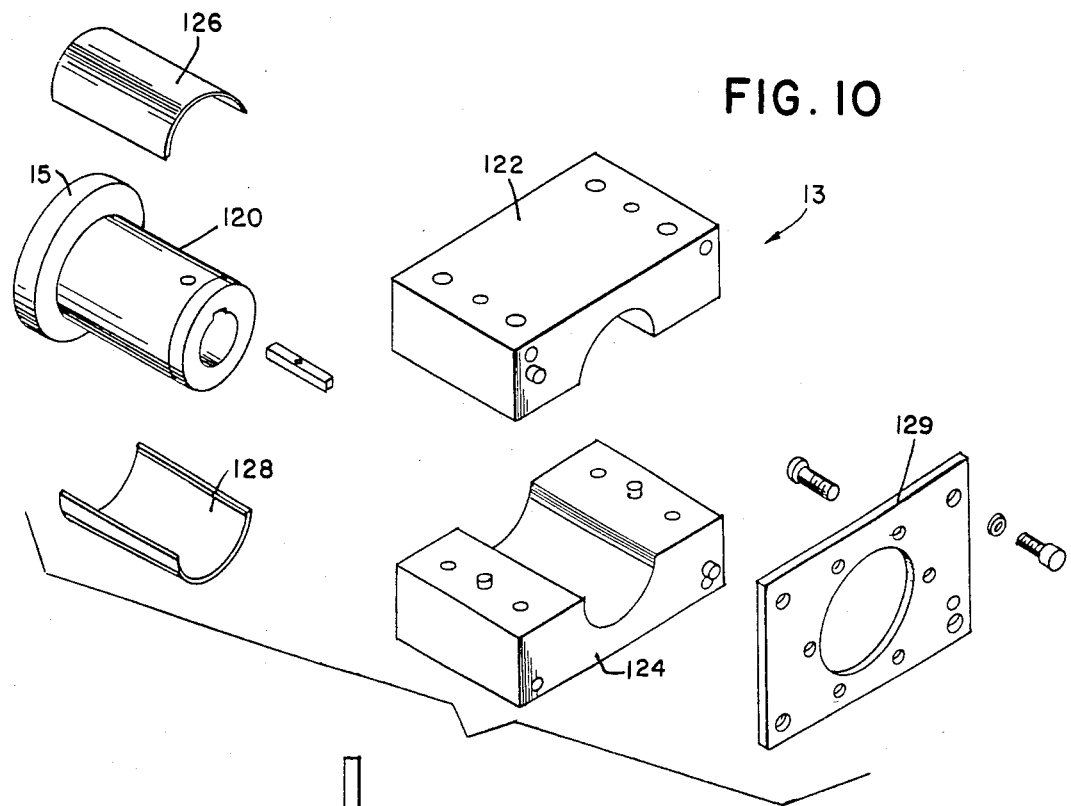
FIG. 10 shows an exploded view of the drive housing assembly.
Figure 11:
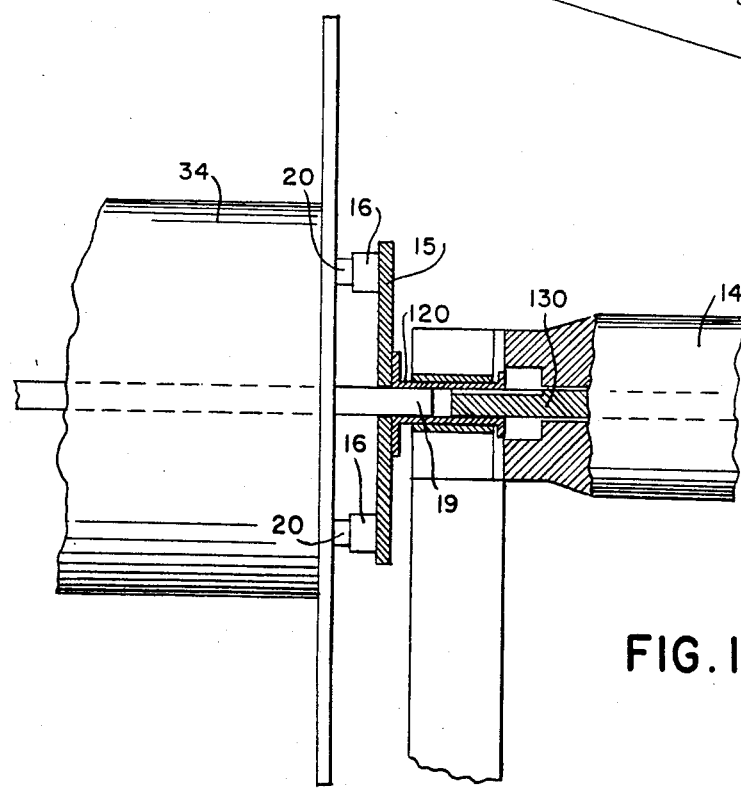
FIG. 11 shows the power train assembly for turning of the spool.

Referring to FIGS. 10 and 11, the reel drive shaft 120 is positioned between blocks 122 and 124 of the bearing housing 13. The bearing facings or bushings shown at 126 and 128 are carried in the recesses of the bearing housing blocks 122 and 124. The reel drive shaft 120 rides on these bushings. When in the assembled position, the end plate 129 is fitted to the ends of blocks 122 and 124 and is attached by screws.

Reel drive shaft 120 is placed between bearing bushings 126 and 128 disposed in the bearing housing blocks 122 and 124. Hydraulic motor 14 has shaft 130, which drives shaft 120 and reel drive face plate 15. It is the spaced pair of lugs, shown at 16, to wheel drive plate 15 that engage the lugs 20 on the spool.

Figure 13:
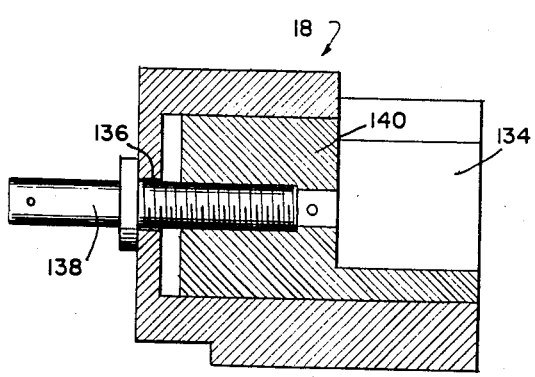
FIG. 13 shows a sectional view of the tail stock assembly of FIG. 12 taken along line 13—13.
Figure 12:
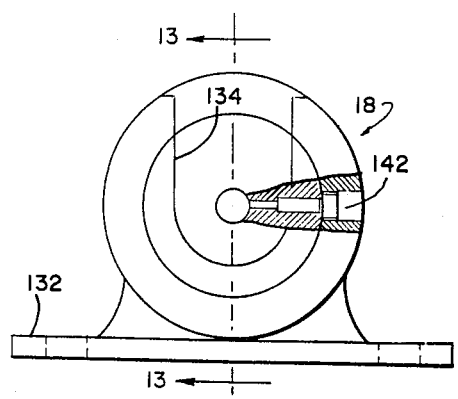
FIG. 12 shows a front view of the tail stock assembly.

Referring to FIGS. 12 and 13, the tail stock assembly 18 is shown. Base 132 of tail stock assembly 18 attaches to the upper surface of one vertical stanchion 11 shown in FIG. 1. The U-shaped recess 134 supports the spool shaft 19, shown in FIG. 1. Hole 136 receives tail stock screw 138, which displaces the tail stock block 140 with recess 134, spool shaft and spool along the longitudinal axis of said shaft and spool. Screw 142 is used to lock block 140 in place once it has affected displacement of the spool and spool shaft the desired distance.

Referring to FIG. 14, the upper quarter of the cable reel spool 34 and the spool shaft 19 is shown. The spool shaft 19 is connected to the cable spool 34 by spool end 144. The spool end 144 differs from the opposite spool end, the difference being that spool end 144 has an ear 20 mounted thereon. The opposite spool end does not possess such an ear. Ear 20 is disposed between the pair of ears 16 of the reel drive face plate 15 to complete the connection so that the spool may be turned when the hydraulic motor is turned clockwise or counterclockwise.

In operation a truck drives beneath a crane. Hydraulic motor 14 aligns face plate 15 so that the spaces between lugs 16 are vertically aligned. Crane-sling hooks are engaged in pipe-lined openings 146 and a reel is lifted from its storage and then lowered so that one end of reel shaft 19 drops into the U-shaped opening 134 in tail stock block 140. At that time the opposite end of the shaft is aligned with the central opening in shaft 120. The crane may be raised or lowered to effect precise alignment if necessary. Tail stock screw 138 in FIG. 13 is turned to advance the block and to push an end of shaft 19 into the opening in shaft 120. At the same time lugs 20 are moved between lugs 16 on face plate 15. Motor 14 may be jogged if necessary to effect precise rotational alignment of the lugs. The crane is lowered and the hooks are disengaged. The reel is ready to be employed.

The truck drives to the location of cable deployment. In a cable laying operation, an outrigger is angularly disposed and locked in position. The telescoping end is drawn out and locked. Motor 14 is turned, and cable is paid out over the horizontal roller and between the vertical rollers. Since the connector at an end of the cable may be too large to fit between outrigger rollers, handle 114 is pulled and rotated upward. The upper roller is locked back in place after the cable is inserted in the outrigger. Cable ends are connected and the operator causes motor 14 to turn while the truck is driven along an edge of the road. The cable drops over the edge to its intended resting space at roadside. When the end of the reel is reached, the connector is passed over the reel and is let out of the outrigger. The outrigger is shortened and returned to the truck side. The truck returns with its empty reel to a position beneath the crane, the tail block is backed off and the reel is lifted and replaced with a full reel.

The procedures are repeated until a full cable connector link is completed, for example, to a new power shovel location in an open pit mine.

The process is reversed to retrieve a cable.

Alternately, when starting a flexible cable, a length may be paid out and a bend may be taken around a vertical roller. The operator may insert the cable end between the outrigger rollers before the outrigger is released to its outward and extended position.

The invention as shown and described herein is what is considered to be the most practical embodiment of the invention, thus being the preferred embodiment. However, it is recognized that there may be departures from the structure described herein which are within the scope of the present invention. Such modifications would be obvious to one skilled in the art and thus would fall within the scope of the present invention, that being the novel and unobvious vehicle mountable cable reel apparatus, as described in the following claims.

What is claimed is:

1. A vehicle mountable hydraulic cable reel apparatus comprising:
    a cable reel bed comprising bed support frame members having rollers mounted thereon;
    a turntable rotatably supported on the rollers;
    a turntable operating motor mounted on the bed, and means connecting said motor to the turntable to turn the turnable;
    first and second vertical stanchions mounted on said turntable and extending upwardly therefrom;
    a first reel support assembly, and means connecting said first reel support assembly to said first vertical stanchion;
    a second reel support assembly, and means connecting said second reel support assembly to the second vertical stanchion;
    a reel motor, and means connecting said reel motor to one of said reel support assemblies, whereby a cable reel supported between the first reel support assembly and the second reel support assembly may be driven by the reel motor, a horizontal roller with vertical guide rollers upwardly disposed at remote end of said horizontal roller with parallel truss means connecting said horizontal and vertical rollers to said first and second vertical stanchions to support the horizontal roller parallel to the axis of the cable reel and spaced radially thereform for supporting and guiding cable extending from the cable reel, wherein the first reel support assembly comprises a base mounted on an upper end of the first vertical stanchion, an upright frame member connected to the base, a sliding block mounted for reciprocal movement on the base, means connected to the frame member and the block for translating the block, the block having an opening for receiving an end of a cable reel shaft, and wherein the block opening comprises a U-shaped upward opening in one end of the block so that a reel shaft may be lowered into the opening.

2. Apparatus according to claim 1 wherein the turntable operating motor is a hydraulic motor and wherein the reel motor is a second hydraulic motor.

3. Apparatus according to claim 1 further comprising pivot means connected to the frame members, outrigger means connected to the pivot means and means for locking the outrigger means at an angle to the frame members, cable guiding means connected to a distal end of the outrigger means for guiding a cable passing through the guider means from the cable reel via a cable roller.

4. Apparatus according to claim 3 wherein the pivot means comprise first and second lugs extending laterally from one end of the frame members and wherein the outrigger means comprise first and second outriggers having proximal ends connected to the lugs and wherein arcuate segments are connected to the outriggers and have holes for receiving pins inserted through the holes.

5. Apparatus according to claim 3 wherein the outrigger means comprise telescoping inner and outer sections, the inner sections being connected to the pivot means and the outer sections sliding within the inner sections and carrying on distal ends thereof guiding means.

6. Apparatus according to claim 3 wherein the guiding means comprises a U-shaped roller assembly.

7. Apparatus according to claim 6 wherein the U-shaped roller assembly opens upwardly and further comprising a horizontal roller connected to upper ends of the U-shaped assembly.

8. Apparatus according to claim 7 wherein the horizontal roller has a first end pivoted to a first upper end of a U-shaped assembly and wherein the horizontal roller has a second end selectively connected to the opposite upward end of the U-shaped assembly.

9. Apparatus according to claim 6 wherein the U-shaped assembly is mounted on a vertical post which is pivoted in a fitting on a distal end of the outrigger.

10. Apparatus according to claim 1 wherein the second reel support assembly comprises a shaft bearing assembly having means for receiving one end of a reel shaft.

11. Apparatus according to claim 10 wherein the receiving means comprises an intermediate shaft having a central opening for receiving the end of the reel shaft and further comprising means for connecting the intermediate shaft to the reel motor for driving the intermediate shaft with the reel motor.

12. Apparatus according to claim 11 wherein the intermediate shaft further comprises a radial face plate on an end thereof toward the reel and further comprising parallel lugs mounted on the radial face plate for engaging the reel to drive the reel.

13. Apparatus according to claim 12 wherein the parallel lug on the intermediate shaft face plate engage diametrically opposite lugs extending outward from an end plate on the reel.

14. Apparatus according to claim 1 further comprising a cable reel for mounting between the first support and the means connecting said first reel support assembly to said first vertical stanchion, the cable reel having a central body and having parallel radially extending end plates at opposite ends of the central body and having shaft ends extending longitudinally from opposite ends of the central body, one shaft end being disposed in the first reel support assembly and the other shaft end being disposed in the means connecting said first reel support assembly to said first vertical stanchion, the end plates having openings extending therethrough for receiving hooks to lift the reel from engagement with the first reel support assembly and the means connecting said first reel support assembly to said first vertical stanchion and lugs extending outward from one end plate and positioned thereon in diametrical alignment with one of the hook-receiving openings, whereby the lugs may be lowered between complementary driving lugs.

15. Apparatus according to claim 14 further comprising an intermediate shaft drivingly connected to the reel motor and positioned in the means connecting said first reel support assembly to said first vertical stanchion, and the intermediate shaft having fixed thereto a radial face plate positioned adjacent the reel end plate, the radial face plate having spaced complementary lugs and diametrically opposed positions for receiving therebetween lugs of the reel end plate.

16. Apparatus according to claim 1 wherein the turntable operating motor is mounted on the bed below the turntable and has a shaft extending upwardly to attach the center of the turntable providing an axis of rotation for the turntable.

17. Apparatus according to claim 1 wherein the frame members comprise first longitudinally disposed frame members and second frame members disposed transverse the first members.

18. Apparatus according to claim 1 wherein the turnable is circular.

* * * * *